United States Patent [19]

Holtz et al.

[11] 4,382,060

[45] May 3, 1983

[54] RADIOACTIVE FUEL CELL STORAGE RACK

[75] Inventors: Maurice Holtz, Huntingdon Valley, Pa.; Krishna P. Singh, Cherry Hill, N.J.

[73] Assignee: Joseph Oat Corporation, Camden, N.J.

[21] Appl. No.: 152,275

[22] Filed: May 22, 1980

[51] Int. Cl.³ .............................................. G21C 19/00
[52] U.S. Cl. ............................... 376/272; 250/506.1
[58] Field of Search ............... 176/30; 250/506, 507; 376/272

[56] References Cited

U.S. PATENT DOCUMENTS

| | | | |
|---|---|---|---|
| 3,732,427 | 5/1973 | Trudeau | 250/108 R |
| 3,859,533 | 1/1975 | Suvanto | 250/507 |
| 4,010,375 | 3/1977 | Wachter | 250/507 |
| 4,024,406 | 5/1977 | Bevilacqua | 250/518 |
| 4,034,227 | 7/1977 | Soot | 250/507 |
| 4,039,842 | 8/1977 | Mollon | 250/518 |
| 4,063,999 | 12/1977 | Wade | 176/28 |
| 4,088,897 | 5/1978 | Soot | 250/507 |
| 4,119,859 | 10/1978 | Karzmar | 250/507 |
| 4,124,445 | 11/1978 | Mollon | 176/87 |
| 4,143,276 | 3/1979 | Mollon | 250/507 |

OTHER PUBLICATIONS

Nucleonics, Apr. 1960, p. 112.

*Primary Examiner*—Donald P. Walsh
*Attorney, Agent, or Firm*—Seidel, Gonda, Goldhammer & Panitch

[57] ABSTRACT

A radioactive fuel cell storage rack is comprised of structural elements including elements which are hollow and cruciform in section. Each leg of the cruciform structural element includes a neutron shield therein. The free end of the legs of the cruciform structural element converge so as to have an included angle of approximately 90°. The rack is comprised of such cruciform elements as well as cooperating elements which are generally T and L shaped in section.

9 Claims, 5 Drawing Figures

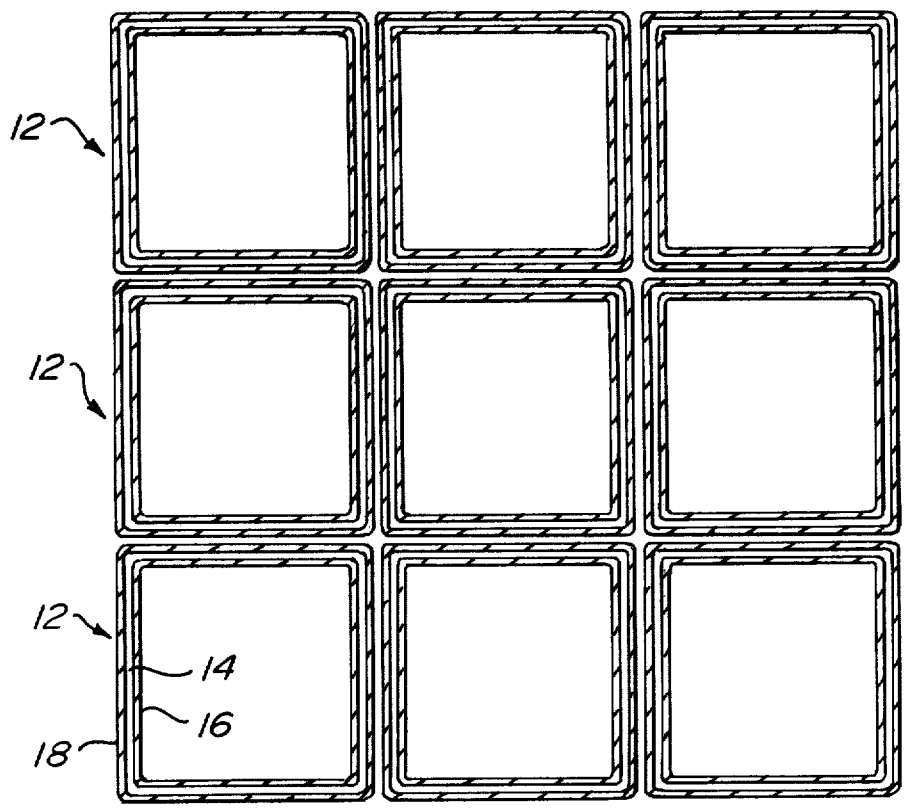
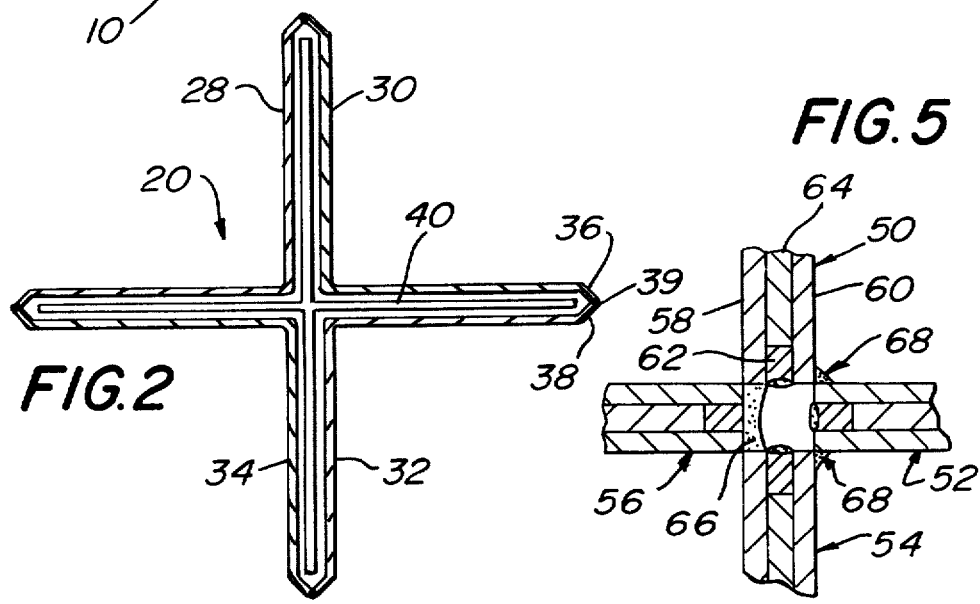

RADIOACTIVE FUEL CELL STORAGE RACK

BACKGROUND

Radioactive material such as fissile fuel elements used in nuclear reactors for the generation of steam in nuclear electric power plants are commonly stored upright in racks. The fuel elements are arranged and spaced with respect to their mutual interreaction by neutrons which they emanate. This phenomenon limits the proximity of the fuel elements to each other for safe storage since neutronic interaction increases when the distance between the fissile fuel elements is reduced. Closer and more economical storage has been achieved by the introduction of a neutron absorbing (or capturing) shield in the cell assemblage.

Elements of spent fuel assemblies freshly removed from a reactor are highly radioactive and therefore they are usually stored vertically submerged in water. The water may contain a dissolved neutron shielding substance. The water also serves to dissipate the heat resulting from the decay of the radioactive matter. Racks for high density storage of fuel elements are commonly of cellular construction with the neutron shield placed between the cells in the form of a solid sheet. The cells are usually long vertical square tubes which are open at the top and through which the fuel elements are inserted. The cells are sometimes with double walls that encapsulate the neutron shield sheets to protect the neutron shield from corrosion or other deterioration resulting from contact with water.

The racks proposed heretofore suffer from disadvantages in that they lack economy and ease of construction. The present invention is a solution to that problem.

SUMMARY OF THE INVENTION

In one aspect of the present invention there is provided an article of manufacture for use and construction of a radioactive fuel storage cell. The article includes a structural element which is hollow and cruciform in section. A neutron shield is provided in each leg of said element. Each leg terminates at a free end in converging surfaces whose included angle is approximately 90°.

Another aspect of the present invention is a rack comprised of a plurality of the above mentioned cruciform elements in combination with mating elements which are T or L-shaped in section but constructed in the same manner.

It is an object of the present invention to provide a novel article of manufacture in the form of a structural element for use in constructing a radioactive fuel cell container.

It is another object of the present invention to provide a rack for radioactive fuel cells constructed from a plurality of mating elements of different section.

It is an object of the present invention to provide novel apparatus wherein the number of structural elements in the construction of the fuel cell rack is minimized while at the same time having improved mechanical rigidity without the need for structural augmentation in the form of frames of substantial size, heavy base plates, bracing, etc.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a sectional view of a typical prior art fuel cell rack as described above.

FIG. 2 is a sectional view of a fuel cell structural element which is cruciform in section and forming part of the present invention.

FIG. 5 is a sectional view of a leg of four adjacent cruciform elements in accordance with another embodiment.

DETAILED DESCRIPTION

Figure 3:
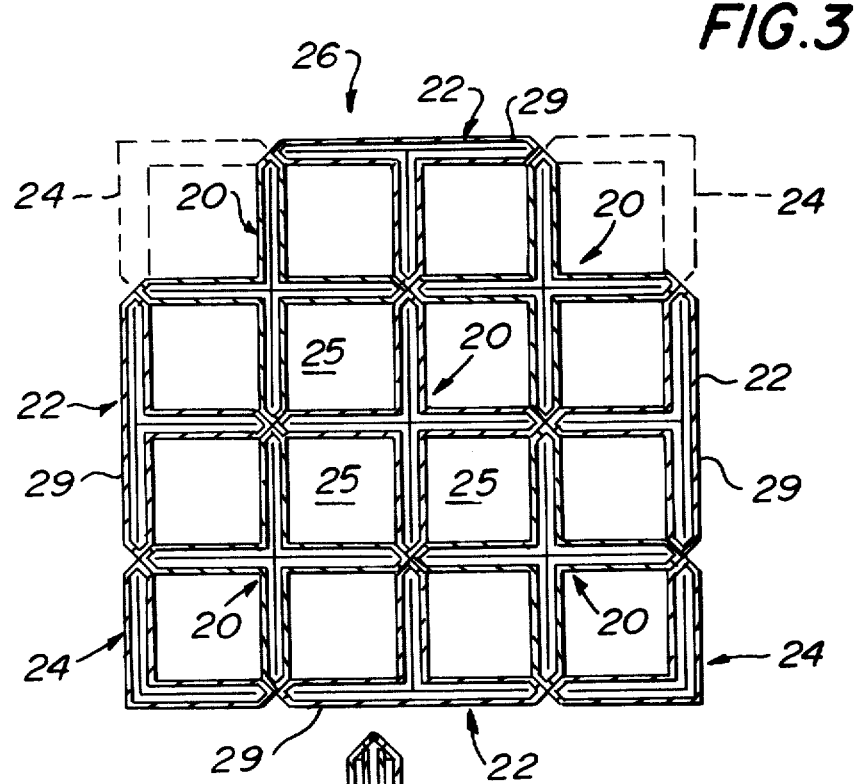
FIG. 3 is a sectional view of a fuel cell rack in accordance with the present invention.

Referring to the drawing in detail, wherein like numerals indicate like elements, there is shown in FIG. 1 a prior art fuel cell rack designated generally as 10. The rack 10 is generally rectangular with each fuel cell element being square in section. Thus, the rack is comprised of a plurality of fuel cell elements each designated 12. Nine such elements are illustrated in FIG. 1. Each element is comprised of an inner jacket 16 and an outer jacket 18 with the space therebetween being occupied by a neutron shield 14.

In FIG. 3 there is illustrated a fuel cell storage rack in accordance with the present invention and designated generally as 26. The rack 26 may be rectangular or have other shapes such as that shown in solid lines in FIG. 3. The rack 26 is comprised of a plurality of structural elements 20 which are cruciform in section in combination with mating elements 22 which are T-shaped in section and elements 24 which are L-shaped in section. Cells 25 are provided for receiving the fuel elements. Typically each cell 25 is a square with each side being approximately 6" and 9" long for boiling water and pressurized water reactor fuel assemblies, respectively.

Referring to FIG. 2, element 20 is comprised of four metal sheets each of which are generally L-shaped in section and designated 28, 30, 32 and 34. Sheets 28, 30, 32 and 34 are commonly stainless steel but other materials such as aluminum are also used. The free ends of each plate converge toward a similar free end on a mating plate. Thus, one leg of plate 30 has a surface 36 which converges toward a mating surface 38 on a leg of plate 32. The free ends of the converging surfaces, whose included angle is approximately 90°, are joined together in any convenient manner such as by a weld 39. The element 20 is hollow and contains therewithin a neutron shield 40 which is likewise arranged so as to be a sheet which is cruciform in section.

The neutron shield is sometimes referred to as a "poison". A wide variety of materials with neutron capturing properties are known to those skilled in the art such as boron in the form of boron carbide which may be disposed uniformly in a matrix of a variety of metals and plastics.

The structural elements 22 and 24 are constructed in a manner similar to that of element 20 with a neutron shield therein. For example, element 22 can be constructed from L-shaped sheets 28, 30 with their free ends welded to the ends of a sheet 29. By using the three elements 20, 22 and 24 a wide variety of different shapes for the rack 26 may be attained. If the rack 10 shown in FIG. 1 were constructed so as to be rectangular, 8 by 10 and thereby provide 80 cells, there would be required 80 double walled square tubes (14, 16, 18). A rack 26 having similar dimensions can be constructed in accordance with the present invention with only 52 cell elements (34 cruciform elements 20, 14 T-shaped elements 22 and 4 L-shaped elements 24). The present invention reduces the total amount of metal sheets for cell wall fabrication since every interior cell needs only four side walls in the present invention as compared with eight side walls in the conventional construction shown in FIG. 1.

The present invention improves mechanical rigidity of the rack. The moment of inertia of the cross-section of the cruciform element 20 when taken in its weakest direction is more than double that of the square tubular element that it replaces in FIG. 1. Therefore, complete racks 26 can be constructed with free standing or independent structural elements of the cruciform type where intermediate supports would be required with a rack made from square tubes as shown in FIG. 1. Furthermore, each of the elements 20, 22 and 24 are shaped at the free ends of their legs so as to match the mating surface of the free end of the next adjacent element.

The cruciform elements may be welded to each other at their juxtaposed mating ends to greatly improve rigidity for withstanding earthquakes and for decreasing weight deflection of the entire rack 26 without the need for rigid frames, heavy base plates, uprights and bracing, etc. A free standing rack in one that is not anchored to the floor. In order to minimize rack movement during seismic events, it is necessary to have racks with high rigidity in horizontal as well as vertical directions. The rack of the present invention has such high rigidity.

Storage pools do not have perfectly rectangular storage space. Prior art rack designs must be rectangular. The present invention permits attainment of a variety of irregular shaped racks so that full use is made of all available floor space.

Figure 4:
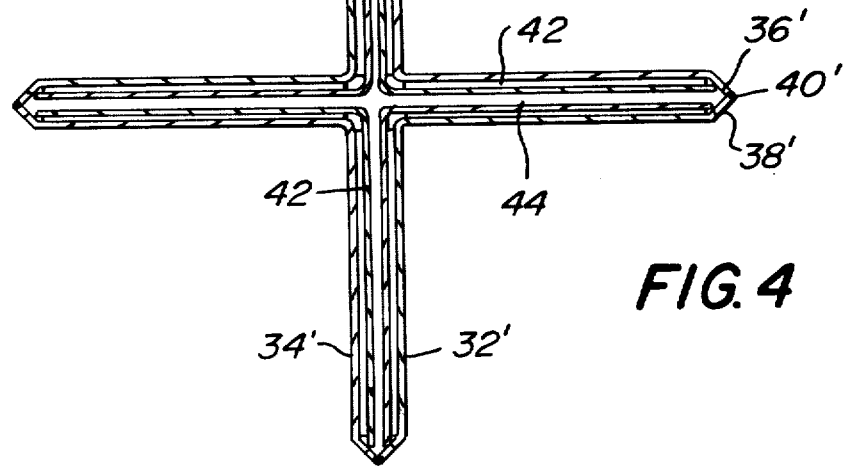
FIG. 4 is a sectional view of another embodiment of a structural element which is cruciform in section.

In FIG. 4, there is shown a structural element 20' which is identical with element 20 except as will be made clear hereinafter. Hence, corresponding elements are identified by corresponding numerals. The element 20' is comprised of L-shaped portions which are hollow with L-shaped neutron shield 42 being disposed between the walls of the hollow L-shaped portions. As a result thereof, between the interior walls of each of the L-shaped hollow portions 28', 30', 32', and 34' there is provided a hollow cruciform space filled with water 44 or other liquid. The water or other liquid constitutes a flux-trap for neutron absorption. Any neutrons which pass through any of the neutron shields 42 will lose energy in the innerposed water 44 whereby they will not have sufficient energy left to pass through one of the other neutron shields 42 thereby substantially increasing the effectiveness of the rack 26. This construction had special advantage in storage of fuel from pressurized reactors.

In FIG. 5 there is illustrated another embodiment wherein one leg of four adjacent cruciforms 50, 52, 54 and 56 are welded together. Each leg is identical whereby only leg 50 will be described in detail. Leg 50 is comprised of thin sheets 58, 60 welded at their extreme ends to a narrow strip insert 62 therebetween. The neutron shield is designated 64. Legs 50, 56 and 54 are joined by weld 66. Leg 52 is joined to legs 50, 54 by fillet welds 68. By way of example, sheets 58, 60 may have a thickness of about 0.075 inches. Shield 64 and fillet 62 may have a thickness of about 0.1 inches.

Thus, the present as described above and as illustrated in the drawings provides novel structural elements for constructing fuel cell racks as well as a novel rack having great versatility, economy, and ease of construction.

The present invention may be embodied in other specific forms without departing from the spirit or essential attributes thereof and, accordingly, reference should be made to the appended claims, rather than to the foregoing specification, as indicating the scope of the invention.

We claim:

1. A structural element for defining walls of cells in a radioactive fuel storage rack comprising a hollow metal element which is cruciform in section so as to have four legs of uniform length, said element being defined by a plurality of sheet metal members welded together and defining a hollow interior space of cruciform shape which extends into said legs, each leg of said element being adapted to be a dividing wall between two adjacent cells, a neutron absorbing shield of cruciform shape, said shield filling said hollow interior, each end of each leg being configured to mate with a leg on a mating structural element which is adapted to define at least one wall of a cell.

2. A structural element in accordance with claim 1 wherein said legs are configured at the free ends in converging surfaces whose included angle is approximately 90°.

3. An article of manufacture in accordance with claim 2 wherein said structural element is comprised of four L-shaped metal members having their free ends bent so as to provide one half of one of said converging surfaces.

4. An article in accordance with claim 3 wherein each L-shaped member is hollow and has a portion of said neutron shield therein, said element having a central space which is cruciform in shape and containing a liquid providing a flux trap.

5. A fuel cell storage rack comprised of three different types of structural elements, the first structural element being cruciform in section and defining a wall of four cells, the second element being T-shaped in section and defining a wall of two cells, the third element being L-shaped in section, each element being hollow and having a neutron shield therewithin, each leg of each element being of uniform length, the number of said first elements exceeding the number of said second elements, the number of said second and third elements being sufficient to provide the desired outline of the periphery of the rack.

6. A rack in accordance with claim 5 wherein each leg of each element terminates at a free end thereof in converging surfaces whose included angle is approximately 90°.

7. A rack in accordance with claim 5 wherein a leg of four adjacent first elements are welded together.

8. An article in accordance with claim 3 wherein said shield is comprised of four L-shaped shields each being in two adjacent legs of said cruciform element.

9. A fuel cell storage rack comprised of a plurality of different types of structural elements, the first structural element being cruciform in section so that each leg thereof defines a wall of four adjacent cells, the second element being T-shaped in section so as to define a wall of two adjacent cells, each element being hollow and having a neutron shield within each leg, each leg of each element being of uniform length, the number of said first elements exceeding the number of said second elements, each leg of each element terminating at a free end thereof in converging surfaces whose included angle is approximately 90°.

* * * * *